United States Patent [19]

Moriguchi et al.

[11] 4,425,568

[45] Jan. 10, 1984

[54] HEAT TRANSFER RECORDING APPARATUS

[75] Inventors: Fujio Moriguchi; Yoshiki Kikuchi; Takashi Ohmori, all of Kanagawa, Japan

[73] Assignee: Fuji Xerox Co., Ltd., Tokyo, Japan

[21] Appl. No.: 312,025

[22] Filed: Oct. 16, 1981

[30] Foreign Application Priority Data

Nov. 17, 1980 [JP] Japan ................................ 55/160797

[51] Int. Cl.$^3$ ...................... G01D 15/10; G01D 15/24

[52] U.S. Cl. ............................. 346/76 PH; 346/135.1

[58] Field of Search ......................... 346/76 PH, 135.1

[56] References Cited

U.S. PATENT DOCUMENTS

| | | | |
|---|---|---|---|
| 4,067,017 | 1/1978 | Dertouzos et al. | 346/76 PH X |
| 4,170,422 | 10/1979 | Bilek | 346/76 PH X |
| 4,195,937 | 4/1980 | Baran | 346/76 PH X |
| 4,359,748 | 11/1982 | Pasini et al. | 346/76 PH |

*Primary Examiner*—George H. Miller, Jr.
*Attorney, Agent, or Firm*—Sughrue, Mion, Zinn, Macpeak and Seas

[57] ABSTRACT

A stress absorbing roller is disposed in the travel path of the ink donor film in a heat transfer recording device. The roller is pivotable to compensate for alignment errors in the transport system, to thereby eliminate wrinkles in the donor film at the recording station.

2 Claims, 2 Drawing Figures

HEAT TRANSFER RECORDING APPARATUS

BACKGROUND OF THE INVENTION

This invention relates to a heat transfer recording apparatus having an ink donor film which is free from any skew.

A heat transfer recording apparatus records information in such a way that the hot-melt ink applied to one surface of the base for an ink donor film is melted in accordance with pictorial information, and transferred onto recording paper. The melting of the solid ink is carried out in such a way that a thermal head (thermal recording head) is brought into contact with the ink donor film moving in the scanning direction, and heat is transmitted to the solid ink through the film base. The ink donor film is required to be as thin as several tens of microns in order to ensure transmission of heat, and proper resolution.

If the film is so thin, however, the ink donor film is very likely to skew when it is subjected to any tension caused by error in the positioning of various parts of the film transport. Any such skew produces a wave on the ink donor film in a direction which is perpendicular to that of its travel, and a wrinkle is formed thereon in the area between the thermal head and the back roll. The wrinkle on the ink donor film disables recording of information by heat transfer. Accordingly, it has heretofore been necessary in a heat transfer recording apparatus to ensure a high degree of accuracy in the fabrication and positioning of parts in the transportation system for the ink donor film and the supply roll for the ink donor film. This has hindered reduction in the cost of the apparatus.

SUMMARY OF THE INVENTION

In view of these circumstances, it is an object of this invention to provide a heat transfer recording apparatus including a skew preventing mechanism which can prevent or reduce the skew of an ink donor film.

According to this invention, the aforesaid object may be attained by a stress absorbing roll unit provided between the supply roll and the area of contact between the thermal head and the back roll, and adapted for inclination at an angle which is variable in accordance with the stress developed along the edges of the ink donor film.

BRIEF DESCRIPTION OF THE DRAWINGS

The invention will now be described in detail with reference to the accompanying drawings, in which.

DETAILED DESCRIPTION OF THE INVENTION

Figure 1:
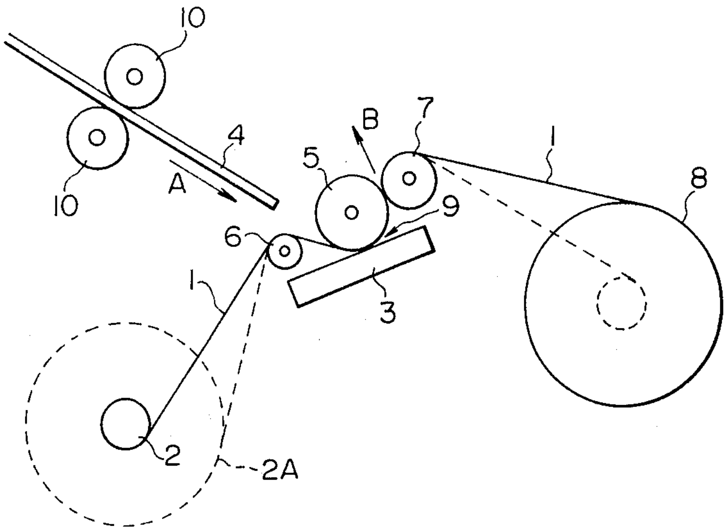
FIG. 1 is a view showing in side elevation the essential arrangement of the heat transfer recording apparatus according to this invention.

FIG. 1 shows the essential arrangement of the heat transfer recording apparatus embodying this invention. This apparatus essentially comprises a supply roll 2 of an ink donor film 1, a thermal head 3, a back roll 5 pressing recording paper 4 against the thermal head 3 with the ink donor film 1 therebetween, a stress absorbing roll unit 6 positioned between the supply roll 2 and the back roll 5, a drive roll 7 contacting the back roll 5, and separating the recording paper 4 from the ink donor film 1, a take-up roll 8 recovering the ink donor film 1 from the back roll 5 and the drive roll 7, and a pair of feed rolls 10 which feed the recording paper 4 into a recording station 9 defined between the thermal head 3 and the back roll 5. Except for the stress absorbing roller, the apparatus of FIG. 1 is substantially similar to that described in copending application Ser. No. 312,020, filed Oct. 16, 1981, and corresponding to Japanese Application No. 55-144419, filed in Japan on Oct. 17, 1980.

If the recording operation is started by depression of a start button (not shown), the feed rolls 10 are driven to move the recording paper 4 in the direction of an arrow A. When the leading end of the paper 4 has reached the vicinity of the stress absorbing roll unit 6, the transport system for the ink donor film is driven to deliver the film 1 from the supply roll 2 to the recording station 9. The paper 4 is then sandwiched between the ink donor film 1 and the back roll 5, and fed into the recording station 9 where the recording of information on paper by heat transfer takes place. The paper 4 leaves the recording station 9 with the ink donor film 1, but when it passes through the area of contact between the back roll 5 and the drive roll 7, it is separated from the ink donor film 1, and travels in the direction of an arrow B. The paper is then discharged into a paper tray (not shown) through a paper outlet (not shown).

The supply roll 2 has an outer periphery shown by broken line at 2A at the very beginning of operation, and has a gradually decreasing diameter as the ink donor film 1 is delivered to the recording station. The supply roll 2 comprises a roll of ink donor film 1 wound about a paper tube. Since there may occur some unevenness in the manner in which the film is wound about the paper tube, or an error in the positioning of the paper tube relative to the apparatus, it is practically impossible to maintain the surface of the ink donor film 1 in parallel to the axis of the back roll 5. Whenever the ink donor film 1 ceases to be in parallel to the axis of the back roll 5, it imparts a force to either end of the stress absorbing roll unit 6, so that the ends of the roll unit 6 are raised or lowered in a direction which is perpendicular to the surface of the film 1.

Figure 2:
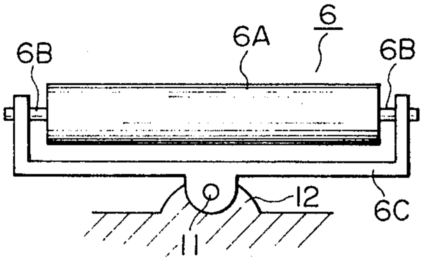
FIG. 2 is a front elevational view showing the stress absorbing roll installed on the frame.

FIG. 2 illustrates the principle of the stress absorbing roll unit 6. The unit 6 utilizes the principle of a balancing toy. It comprises a roll 6A, a shaft 6B on which the roll 6A is rotatably supported, a member 6C for supporting the shaft 6B, and pin 11 which supports the supporting member 6C rotatably on a projection 12 of the frame of the apparatus. If the ink donor film 1 is subjected to any stress when it is travelling, the supporting member 6C is tilted about the pin 11 in the direction in which the stress has been applied. As a result, the unit 6 immediately absorbs the stress acting on the ink donor film 1, and prevents formation of any wave on the film surface. The pin 11 may advantageously be connected to the roll unit somewhat loosely, so that the roll 6A may also be displaced to some extent in the direction of travel of the ink donor film 1 for appropriate removal of any stress acting on the film in the direction of its travel.

According to this invention, it is, thus, possible to provide a highly reliable heat transfer recording apparatus which permits recording of information by heat transfer without any problem, even with normal errors in the installation of the ink donor film transport system.

Although the invention as hereinabove described comprises only the stress absorbing roll between the supply roll and the back roll, it is, of course, possible to also position other rolls, such as guide or feed rolls, in that area.

What is claimed is:

1. A heat transfer recording apparatus, comprising:

a first source of ink donor film;

a second source of a recording medium;

a recording station having a thermal element for selectively heating said ink donor film for recording information on said recording medium by heat transfer;

a transport system for bringing said donor film and recording medium into contact for movement in the same direction at least in the vicinity of said thermal element, said transport system including a stress absorbing roller across which said donor film passes between said first source and thermal element, a back roll across which said recording medium and said ink donor film pass in the vicinity of said thermal element and a support member for rotatably supporting said stress absorbing roller at either end, said support member being pivotably mounted substantially at its center so that the axis of said stress absorbing roller can be inclined in either direction with respect to the plane of said donor film as said film passes said thermal element.

2. A heat transfer recording apparatus as defined in claim 1, wherein said stress absorbing roller is mounted for at least limited movement of its axis in the direction of travel of said donor film.

* * * * *